(12) United States Patent
Perrot

(10) Patent No.: US 11,338,836 B2
(45) Date of Patent: May 24, 2022

(54) SINGLE PUSHCHAIR WHICH CAN BE CONVERTED INTO A TANDEM PUSHCHAIR THAT IS PRACTICAL TO USE

(71) Applicant: VIDIAMO, Neuilly-sur-Seine (FR)

(72) Inventor: Bénédicte Perrot, Neuilly-sur-Seine (FR)

(73) Assignee: VIDIAMO, Neuilly-sur-Seine (FR)

( * ) Notice: Subject to any disclaimer, the term of this patent is extended or adjusted under 35 U.S.C. 154(b) by 702 days.

(21) Appl. No.: 16/094,598

(22) PCT Filed: Apr. 18, 2017

(86) PCT No.: PCT/FR2017/050915
§ 371 (c)(1),
(2) Date: Oct. 18, 2018

(87) PCT Pub. No.: WO2017/182751
PCT Pub. Date: Oct. 26, 2017

(65) Prior Publication Data
US 2021/0221421 A1    Jul. 22, 2021

(30) Foreign Application Priority Data
Apr. 19, 2016 (FR) ........................ 1653462

(51) Int. Cl.
*B62B 7/12* (2006.01)
*B62B 9/12* (2006.01)
(Continued)

(52) U.S. Cl.
CPC ................ *B62B 7/008* (2013.01); *B62B 7/12* (2013.01); *B62B 9/12* (2013.01); *B62B 9/28* (2013.01); *B62B 2206/006* (2013.01)

(58) Field of Classification Search
CPC ............ B62B 7/008; B62B 7/12; B62B 7/123; B62B 9/12; B62B 9/28; B62B 2206/006; B62B 2206/02
See application file for complete search history.

(56) References Cited

U.S. PATENT DOCUMENTS 292,933 A *  2/1884 McKnight ............ B60N 2/2806
                                                   280/658
329,579 A * 11/1885 McLean ............... B60N 2/2806
                                                   280/658
(Continued)

FOREIGN PATENT DOCUMENTS

CN         2043579 U     8/1989
CN       201371841 Y * 12/2009 ............. B62B 7/008
(Continued)

OTHER PUBLICATIONS

International Search Report for PCT/FR2017/050915 dated Jul. 4, 2017.

*Primary Examiner* — Steve Clemmons
(74) *Attorney, Agent, or Firm* — Bachman & LaPointe, P.C.

(57) ABSTRACT

The invention relates to a single pushchair that can be converted into a tandem pushchair, comprising: a rolling chassis; a main seat mounted with the ability to move in longitudinal translation with respect to the chassis between a single-occupant position and a dual-occupant position; an auxiliary seat, mounted with the ability to move in longitudinal translation with respect to the chassis between an inactive position retracted underneath the main seat in its single-occupant position, and a deployed active position outside the main seat in its dual-occupant position.

15 Claims, 8 Drawing Sheets

(51) Int. Cl.
 *B62B 7/00* (2006.01)
 *B62B 9/28* (2006.01)

(56) References Cited

U.S. PATENT DOCUMENTS

| | | | | |
|---|---|---|---|---|
| 4,953,887 | A * | 9/1990 | Takahashi | B62B 9/26 |
| | | | | 280/47.38 |
| 6,676,140 | B1 | 1/2004 | Gondobintoro | |
| 8,070,180 | B2 * | 12/2011 | Stiba | B62B 3/027 |
| | | | | 280/648 |
| 8,128,103 | B1 | 3/2012 | Schutzendorf et al. | |
| 8,152,177 | B1 * | 4/2012 | Johnson | B62B 5/085 |
| | | | | 280/33.993 |
| 8,186,705 | B2 * | 5/2012 | Greger | B60N 2/2821 |
| | | | | 280/643 |
| 8,596,670 | B2 * | 12/2013 | di Carimate | B62B 7/142 |
| | | | | 280/650 |
| 8,915,516 | B2 * | 12/2014 | Yang | B62B 9/28 |
| | | | | 280/642 |
| 9,511,789 | B2 * | 12/2016 | Cheng | B62B 7/008 |
| 10,077,063 | B2 * | 9/2018 | Haut | B62B 9/20 |
| 2007/0001429 | A1 | 1/2007 | Maciejczyk | |
| 2010/0283227 | A1 | 11/2010 | Perelli et al. | |
| 2015/0217792 | A1 * | 8/2015 | Stiba | B62B 9/20 |
| | | | | 280/650 |
| 2015/0232114 | A1 * | 8/2015 | Gillett | B62B 7/06 |
| | | | | 280/30 |

FOREIGN PATENT DOCUMENTS

| | | | | |
|---|---|---|---|---|
| EP | 1764282 | A2 * | 3/2007 | B62B 7/10 |
| GB | 1122058 | A * | 7/1968 | B62B 7/145 |
| WO | WO-2006015122 | A2 * | 2/2006 | B62B 7/12 |
| WO | 2010/019779 | A1 | 2/2010 | |
| WO | 2010/116215 | A1 | 10/2010 | |

* cited by examiner

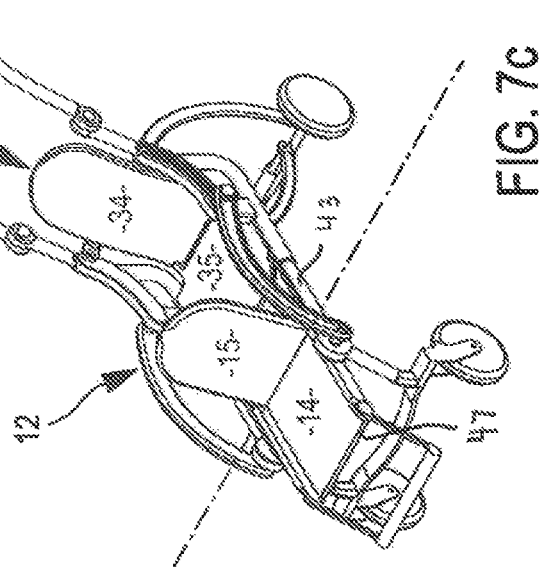
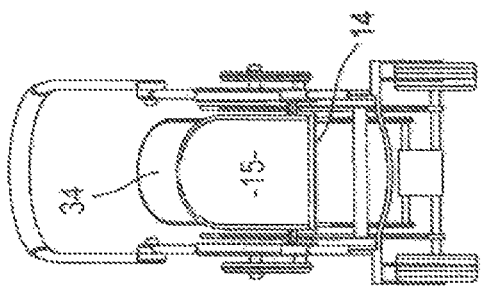
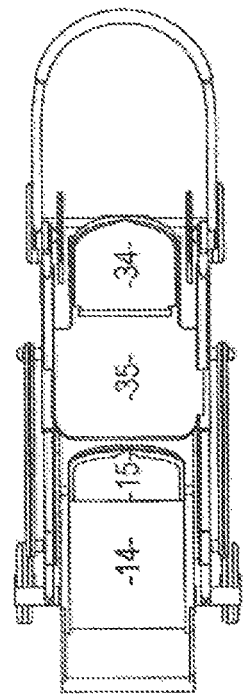
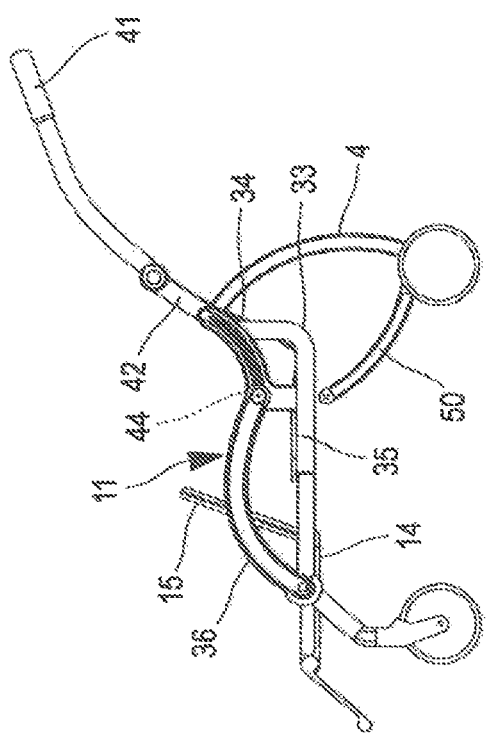

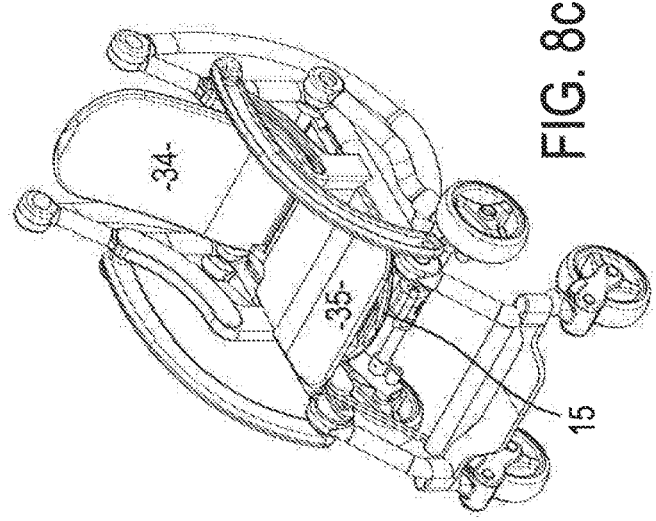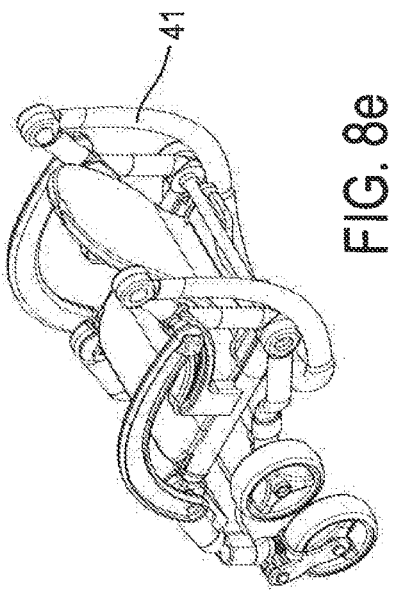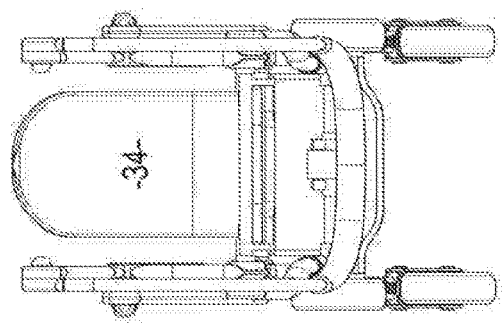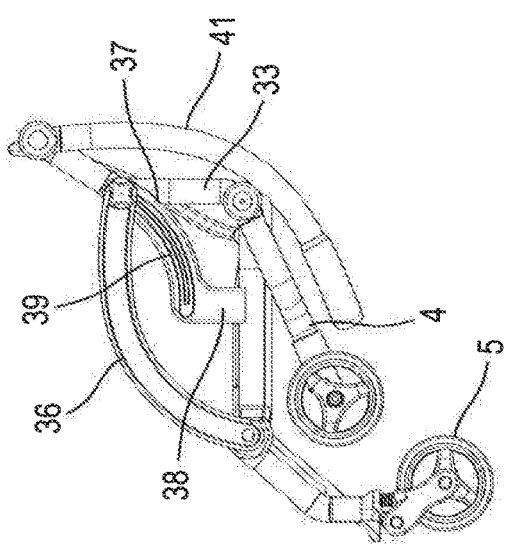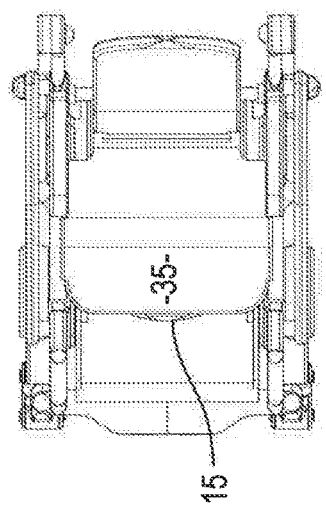

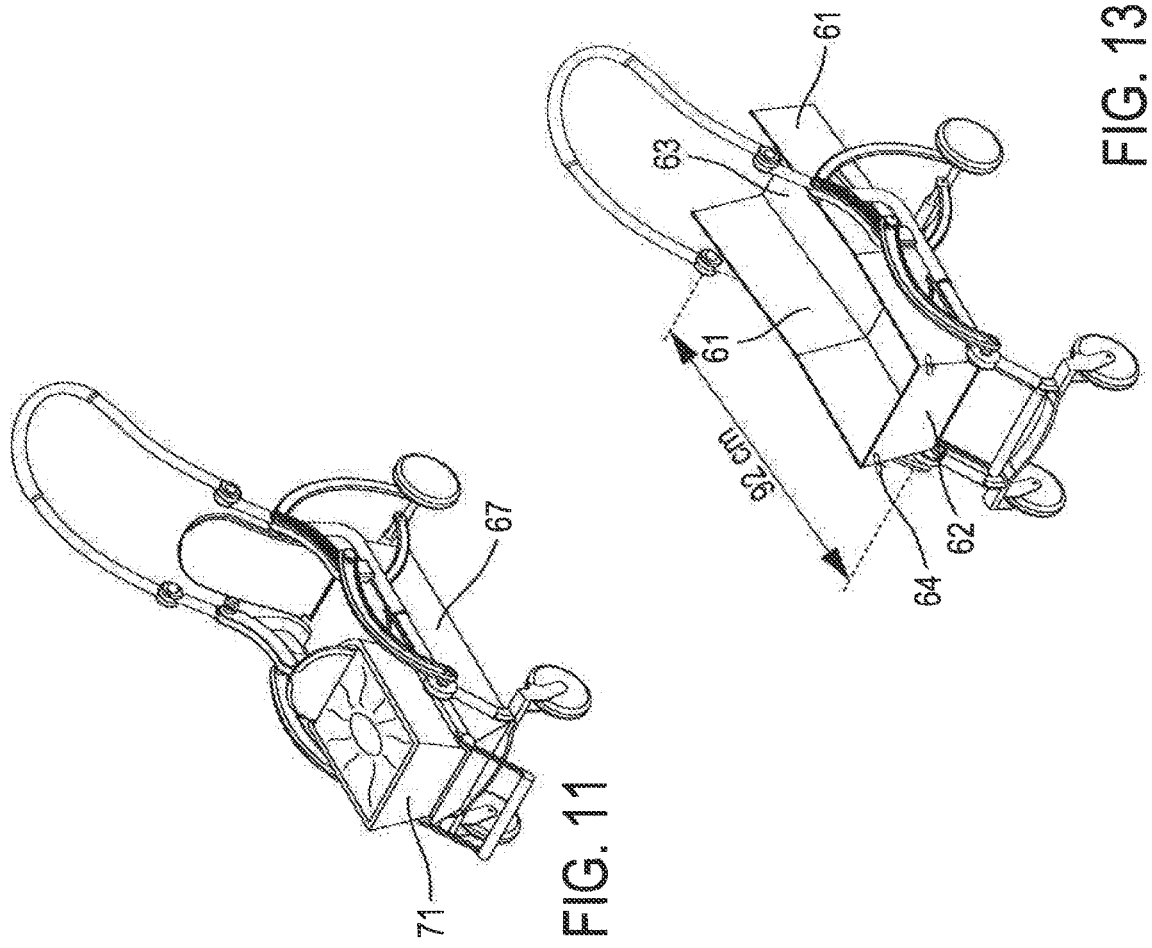
FIG. 10
FIG. 11
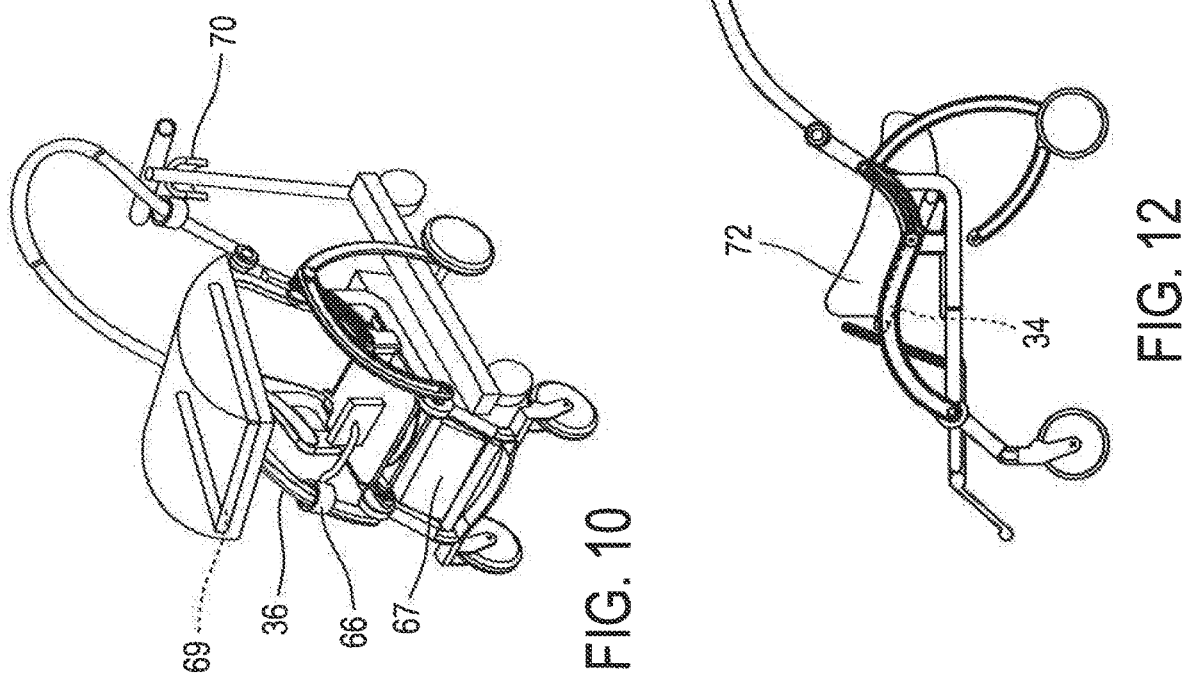
FIG. 12
FIG. 13

SINGLE PUSHCHAIR WHICH CAN BE CONVERTED INTO A TANDEM PUSHCHAIR THAT IS PRACTICAL TO USE

BACKGROUND OF THE INVENTION

The invention relates to a single pushchair that can be converted into a tandem pushchair.

Such type of pushchairs has the advantage of offering the adults accompanying one child or two children, a single seat for one child, in the single configuration, and two seats for two children in the tandem configuration.

This further makes it possible, during the walk with two children of different ages, for instance, to walk the younger child in the main seat of the pushchair in the single configuration, whereas the older one walks, and when the older child is tired, to seat him/her in the auxiliary seat of the pushchair, without having to face, in the single configuration, the bulkiness of a tandem pushchair.

A single pushchair which can be converted into a tandem, fully folding pushchair is known from the U.S. Pat. No. 8,915,516. The transition between the single seat configuration and the tandem configuration is provided through a telescopic-structured chassis, the length of which is increased for releasing a space at the back of the main seat, where an auxiliary seat can be positioned for another child.

However, on the one hand, the telescopic-structured chassis comprises two side cross-bars at a child's height, each one consisting of two mutually engaged tubes, liable to cause the child's skin to get pinched when the pushchair is changed into either one of the single or dual configurations thereof. Besides, to use such a pushchair, the auxiliary seat has to be stored when not used during the walk, which implies an additional load for the adult who accompanies the children. Additionally, when the pushchair is used in tandem mode, the back of one of the two seats is not provided for reclining rearwards to enable one of the two children to lie down.

The U.S. Pat. No. 6,676,140 discloses a pushchair provided with two nestable seats (FIG. 2), which can also be positioned apart from one another thanks to a simple translation, so that another child can be seated (FIG. 1). However, the design of such pushchair does not make it possible to completely fold the device into an umbrella stroller configuration, although it has the advantage of having an easily deployable auxiliary seat.

The U.S. Pat. No. 8,128,103 relates to an umbrella stroller provided with an auxiliary seat attached to one side of the main seat, without the possibility of completely folding the stroller. When using such device with two children, the side overall dimension of the stroller is significantly increased, and the risks that a child seating in the auxiliary seat might be hurt is increased accordingly.

SUMMARY OF THE INVENTION

The invention aims at remedying such problems by providing a single pushchair that can be converted into a tandem pushchair, with no auxiliary seat to be added, and the changing thereof from the single to the tandem configuration can be executed while keeping the seating child/children perfectly safe.

For this purpose, and according to one aspect, the invention provides for a single pushchair that can be converted into a tandem pushchair comprising:
  a chassis
  a main seat mounted with the ability to move in longitudinal translation with respect to the chassis between a single-occupant position and a dual-occupant position
  an auxiliary seat, mounted with the ability to move in longitudinal translation with respect to the chassis between an inactive position retracted underneath the main seat in its single-occupant position, and a deployed active position outside the main seat in its dual-occupant position.

According to further advantageous characteristics of the invention:
  the auxiliary seat comprises a seating surface and a back which can be folded against the seating surface in the retracted inactive position
  the pushchair comprises means for automatically moving the back of the auxiliary seat from a folded position to a deployed position when the auxiliary seat is moved between its retracted position and its deployed position
  the main seat is mounted with the ability to move in longitudinal translation via a shaft sliding in a chassis rail
  the main seat is mounted with the ability to pivot between a position in which the occupant is seating and a position in which the occupant is lying down in the single-occupant position and/or in the dual-occupant position
  the structure chassis comprises two front uprights supporting the front wheels and two rear uprights supporting the rear wheels, with the front and rear uprights positioned on the same side of the chassis being secured together by means of a main cross-bar
  the main seat is mounted with the ability to pivot between the position in which an occupant is seating and a folded position of the pushchair in which it is folded between the front uprights of the chassis when the auxiliary seat is in its retracted position
  the rear uprights are mounted with the ability to pivot relative to the cross-bar between a conventional rolling position and a folded position of the pushchair in which they are positioned substantially parallel to the front uprights
  the auxiliary seat and the means for moving same between the retracted and deployed positions are contained in the volume defined by the front uprights and the rear uprights in the position same take when the pushchair is folded
  the means for moving the auxiliary seat between the retracted and deployed positions thereof comprise a rigid part having a C-shaped section, the opening of which is oriented towards the front of the pushchair, and the two parallel branches of which are mounted with the ability to slide relative to the pushchair chassis and specifically to the front upright of the pushchair
  the front uprights each comprise two shafts for guiding the sliding of the branches of the C-shaped part
  the chassis comprises a telescopic cross-bar having an extended position during the current utilization of the pushchair in the single or dual configuration, and a reduced position when the pushchair is folded
  the main structure of the chassis is not telescopic, and the main upper cross-bar is not telescopic either
  according to an alternative embodiment, the chassis comprises two side bars 43
  which can be deployed relative to matching side stationary supports 33, two side arms 36 mounted, by the matching ends thereof, to the front ends of the bar by means of pivot connections, with the opposite ends of such arms translating in guide rails integral with the matching stationary supports 33 when the pushchair is changed from a single configuration to a dual configuration.

In this case, the auxiliary seat is mounted with the ability to translate with respect to the bar between its retracted and deployed positions.

Ideally, the pushchair comprises means for locking the auxiliary seat in an intermediate position, wherein, when the back is folded against the seating surface thereof, the rear face of the seating surface extends as a longitudinal extension of the seating surface of the main seat.

The invention also relates to a mattress specially adapted to the pushchair comprising a base defining two different thicknesses liable to make up for a difference in height which may exist between the upper surface of the folded back of the auxiliary seat in the intermediate position thereof and the upper surface of the seating surface of the main seat.

The invention finally relates to a bag specially adapted to the pushchair having variable dimensions in the direction of the extension of the pushchair between the tandem and single configurations thereof.

BRIEF DESCRIPTION OF THE FIGURES

Further objectives and advantages of the invention will become apparent from the following description made in reference to:

FIGS. 7a to 7d illustrate the second embodiment of the invention in a tandem configuration, in views at the 1:5 scale, respectively a side view (a), a front view (b), a front side view in perspective (c), and a top view (d)

FIGS. 8a to 8e illustrate the second embodiment of the invention in a folded storage configuration, in views at the 1:5 scale, respectively a side view (a), a front view (b), a front side view in perspective (c), and a top view (d) and a rear side view in perspective

FIG. 10 shows the second embodiment in a single configuration with a first series of accessories FIG. 11 shows the second embodiment in a tandem configuration with a second series of accessories FIG. 12 shows the second embodiment in a tandem configuration, with the back of the main seat being in an oblique position, frontwards, of the pushchair to be used as a support for an accessory of the Moses' basket or bunting bag type, and with the back of the auxiliary seat being returned to the upright position.

FIG. 13 shows the second embodiment in a configuration where a child is lying down, to be used as the support for an accessory of the mattress type for a child to lie down.

DETAILED DESCRIPTION

Figure 2:
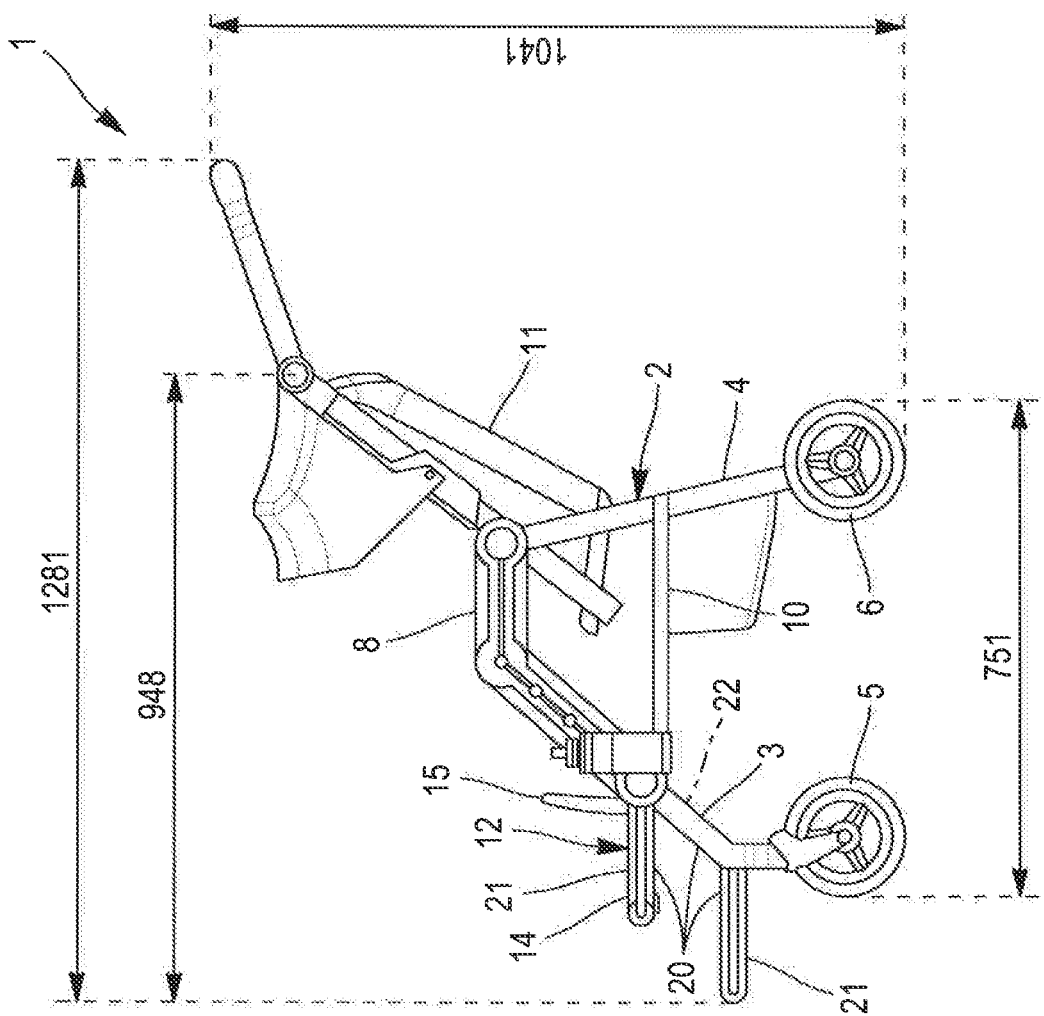
Figure 1:
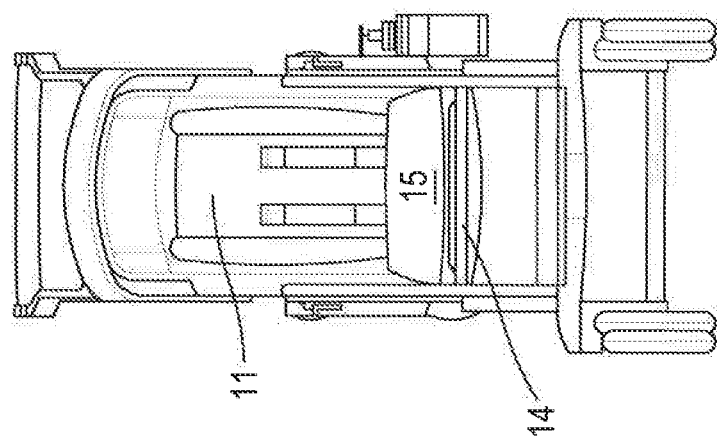
FIG. 1 which shows a front view, at the 1:10 scale, of the pushchair according to a first embodiment of the invention in a tandem configuration FIG. 2 which shows a side view, at the 1:10 scale, of the pushchair according to a first embodiment of the invention in a tandem configuration FIG. 3 which shows a front view, at the 1:10 scale, of the pushchair according to a first embodiment of the invention in a single configuration FIG. 4 which shows a side view, at the 1:10 scale, of the pushchair according to a first embodiment of the invention in a single configuration FIGS. 5a to 5c respectively illustrate three steps of the folding of the pushchair according to a first embodiment of the invention
Figure 4:
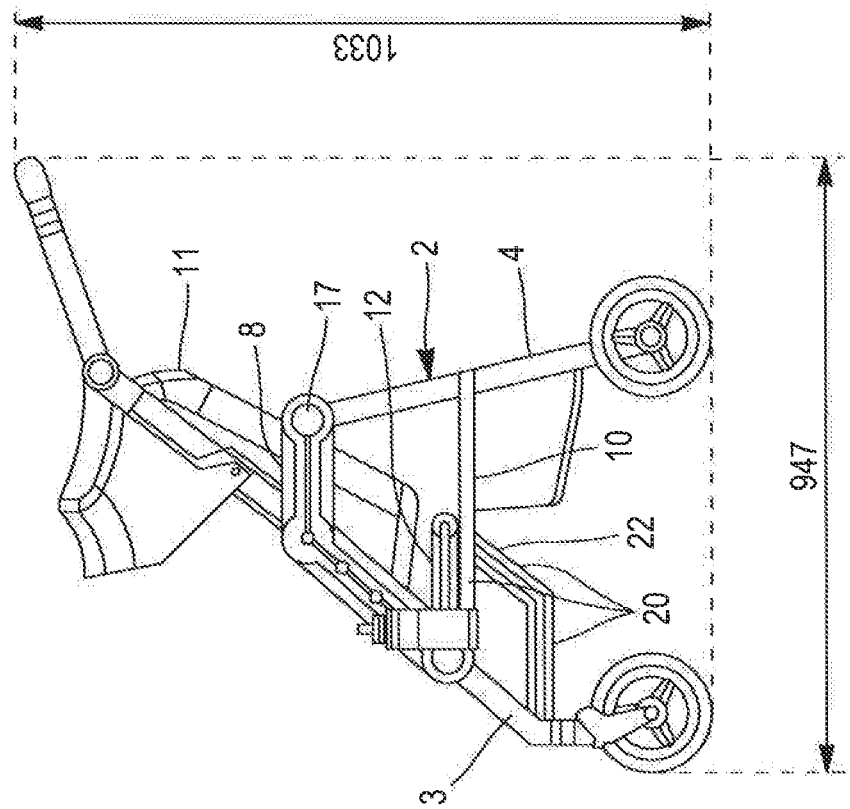
Figure 3:
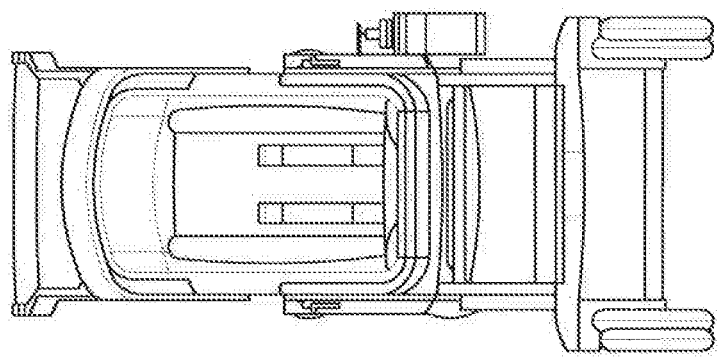

FIG. 1 discloses a single pushchair that can be converted into a tandem pushchair 1 mainly comprising:

a chassis which, according to the illustrated embodiment, has a non-telescopic structure 2, with such chassis comprising two front uprights 3 supporting the front wheels and two rear uprights 4 supporting the rear wheels 6, with the front 3 and rear 4 uprights positioned on the same side of the chassis being secured together by means of a non-telescopic main cross-bar 8. The chassis 2 further comprises a lower cross-bar 10 substantially positioned at mid-height of the chassis, which is telescopic in length between an extended position during the current utilization of the pushchair (as shown in FIG. 2) and a reduced position when the pushchair is folded (as shown in FIG. 5). The rear uprights 4 are slightly inclined rearwards and the front uprights 3 are slightly inclined frontwards, whereas the upper cross-bar 8 and the lower cross-bar 10 are substantially horizontal.

a main seat 11 mounted, for switching from a single to a tandem configuration, having the ability to move in longitudinal translation with respect to the upper cross-bar 8, between a single-occupant position (FIG. 4) in which it is positioned in the volume defined by the front and rear uprights of the chassis, and a dual-occupant position (FIG. 2) in which it is positioned at the rear of the chassis (behind the volume defined by the front and rear uprights of the chassis)

an auxiliary seat 12, mounted with the ability to move in longitudinal translation with respect to the front uprights 3 of the chassis between an inactive position (FIG. 4) retracted underneath the main seat in its single-occupant position 11, and a deployed active position (FIG. 2) outside the main seat in its dual-occupant position. The auxiliary seat 12 comprises a seating surface 14 and a back 15 which can be folded against the seating surface 14 in the retracted inactive position. The means for moving the auxiliary seat between the retracted position and the deployed position thereof comprise two rigid parts having a C-shaped section 20, the opening of which is oriented towards the front of the pushchair, and the two parallel branches 21 of which are mounted with the ability to horizontally slide relative to the matching front upright 3 of the pushchair, using external rails supported by such branches 21, and a shaft supported by each of such matching front uprights 3 which are engaged in such rails. When pressed, a knob for releasing the front/rear motion of the auxiliary seat, which axially coincides with the shaft supported by the upper branch 21 enables the auxiliary shaft to move from the retracted position to the deployed position. The intermediate branch 22 of the C-shaped part has the same inclination as the matching front upright and coincides therewith in the tandem configuration of the pushchair (FIG. 2), and behind same in the single configuration (FIG. 4)

Ideally, the pushchair comprises means for automatically moving the back 15 of the auxiliary seat 12 from a folded position to a deployed position when the auxiliary seat 12 is moved between its retracted position and its deployed position.

More precisely, the main seat 11 is mounted with the ability to move in translation along the upper cross-bar 8 of the chassis using two side shafts of such seat 11 sliding in two matching rails positioned on the inner face of the upper cross-bars 8 of the chassis.

The main seat 11 is further mounted with the ability to pivot between a position in which the occupant is seating and a position in which the occupant is lying down and reclining rearwards, in the single-occupant position and/or in the dual-occupant position, about such shafts. Besides, it is mounted with the ability to pivot between the position in which an occupant is seating and a folded position, tilted frontwards, of the pushchair in which it is folded between the front uprights of the chassis when the auxiliary seat is in its retracted position.

A half-disc shaped knob 17 which axially coincides with both shafts, must be actuated by pressing to enable the translation of the shafts along the rails, or the pivoting of such shafts when the seat switches from its conventional seating position, its expanded position and the pushchair folding position. It acts as the means releasing the motions of the main seat and it is a means for locking same.

Figure 5A:
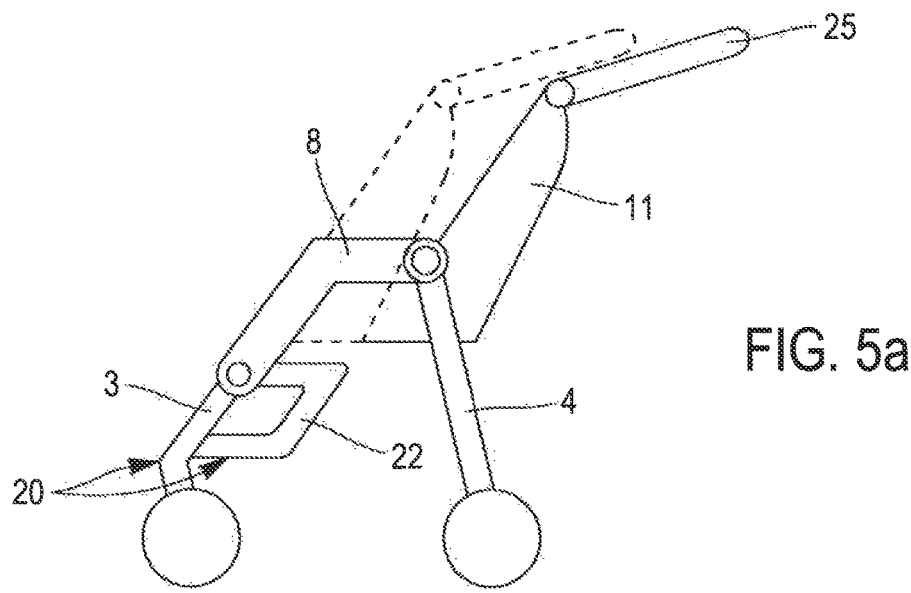
Figure 5B:
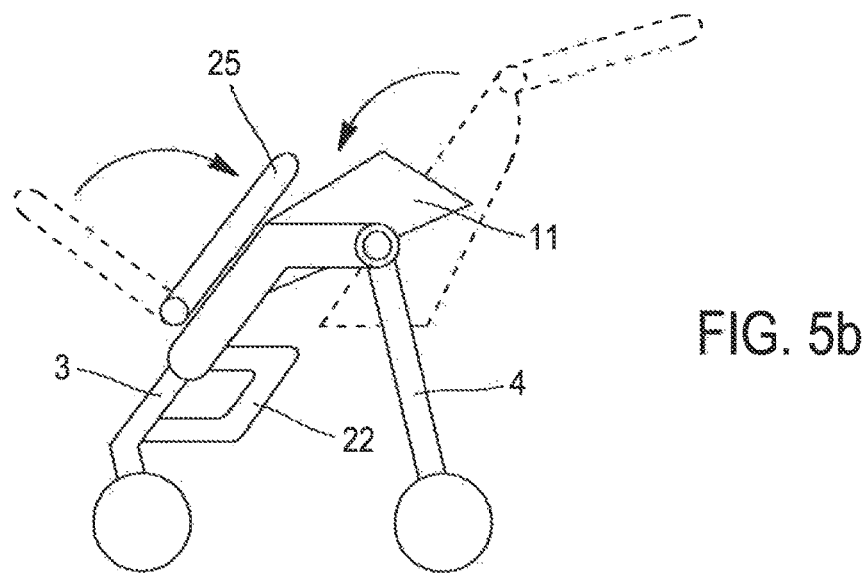
Figure 5C:
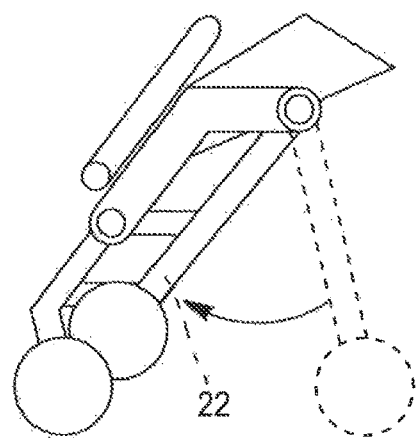

To enable the complete folding of the pushchair as shown in FIGS. 5a to 5c, the rear uprights 4 are mounted with the ability to pivot with respect to the non-telescopic cross-bar 8 between a conventional rolling position and a pushchair folding position in which they are positioned substantially parallel to the front uprights 3 (FIG. 5c) and coincide with the intermediate branch 22 of the C-shaped rigid part providing for the motions of the auxiliary seat (FIG. 4).

When folding the pushchair, the main seat 11 is first (FIG. 5a) pushed backwards outside the chassis, while the auxiliary seat is retracted thereunder.

As shown in FIG. 5b, the main seat 11 then pivots frontwards to be folded between the front uprights 3 of the pushchair and the grip 25 is also folded after the locking knob has released the pivoting thereof.

The rear uprights 4 are then positioned at the folding position thereof and pivot frontwards as shown in FIG. 5c and reach the position coinciding with the intermediate branch 22 of the C-shaped part.

During this motion, the telescopic cross-bar 10 switches from its extended position during the current utilization of the pushchair in the single or tandem configuration, to its reduced position when the pushchair is folded.

The auxiliary seat, the C-shaped rigid part are then contained in the volume defined by the front uprights and the rear uprights in the folding position of the pushchair and thus take minimum overall dimensions.

The non-telescopic main structure of the chassis (upper cross-bar 8, front 3 and rear 4 uprights), described above as an example, has the advantage of preventing a child or an adult handling the pushchair from having fingers caught. In this case, the main seat 11 is movable in translation with respect to the chassis.

Another solution consists in providing for a chassis some elements (for instance the upper cross-bar) of which would be telescopic, and equipped with the recommended safety devices. In this case, the main seat may be stationary, in translation, and the chassis may extend in length, in order to increase the space devoted to the auxiliary seat in its deployed position, or also be movable in translation and still increase such space.

One exemplary embodiment of such solution is illustrated in FIGS. 6 to 13, and disclosed above.

The elements common to the first embodiment of the invention illustrated in FIGS. 1 to 5 and the second embodiment illustrated in FIGS. 6 to 13 have the same names and references.

According to such second embodiment, the chassis 32 of the pushchair mainly comprises:
One portion which remains stationary in translation when the pushchair changes from the single configuration to the tandem configuration and
One portion which is movable in translation in the same case The so-called stationary portion of the chassis is comprised of:
two side elbows 33 having, when seen on one side, a general L shape, the two branches of which are positioned along the back 34 of the main seat in a child seating position, and the seating surface 35 thereof, respectively,
two small side arches 37 having a general C shape, the round end of which is oriented downwards when the pushchair is in the current utilization position (FIGS. 6a and 7a), with the upper ends of each arch being mounted to be stationary on the upper end of the matching elbow 33, with the opposite ends of each arch being positioned above the seating surface of the main seat (for instance 5 cm above the seat), thanks to a leg 38 which extends same. A guide rail 39 is provided outside each small arch 37, and cooperates with an additional means on the portion of the chassis which is movable in translation when the pushchair switches from the single configuration to the tandem configuration
the two rear uprights 4
the gripping frame 41, the two ends of which are mounted on two side segments 42 which extend upwards the upper ends of the small arches 37

Figure 6C:
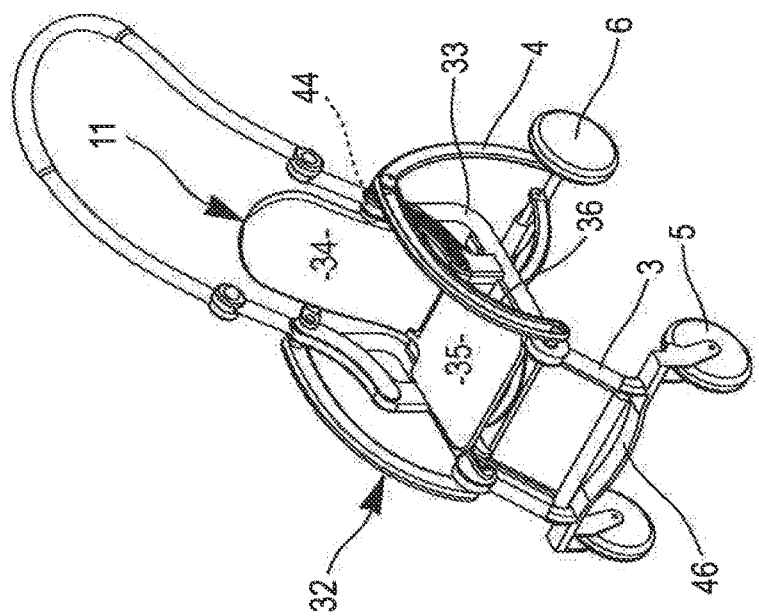
FIGS. 6a to 6d illustrate a second embodiment of the invention in a single configuration, in views at the 1:5 scale, respectively a side view (a), a front view (b), a front side view in perspective (c), and a top view (d)
Figure 6B:
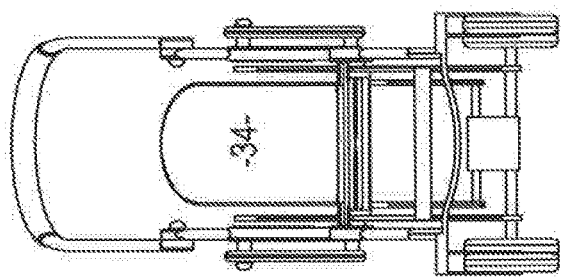
Figure 6A:
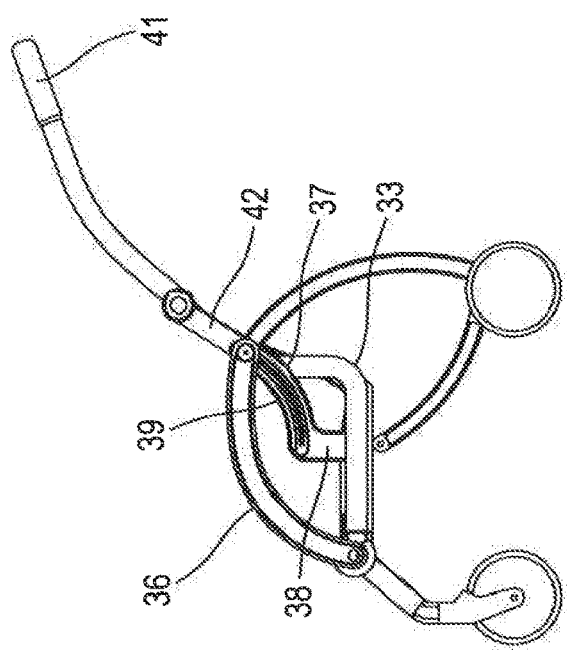
Figure 6D:
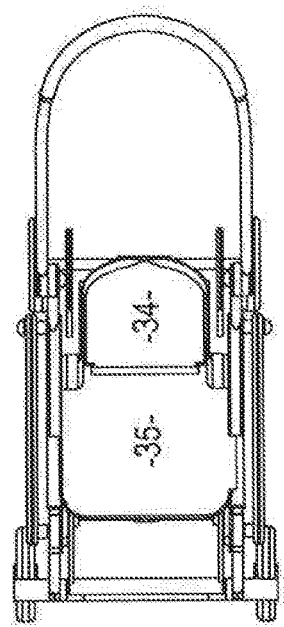

The so-called mobile portion of the chassis is comprised of:
Two horizontal side bars 43 (visible when the pushchair is deployed only) mounted with the ability to translate within the horizontal portion of the matching elbow 33 which is hollow then, or two telescopic portions extending the matching horizontal portions of the elbow 33. As shown in FIG. 7c, the front end of each bar 43 supports a shaft whereon the matching front upright 3 of the pushchair is mounted
two large side arches 36 having a general C shape, the round end of which is oriented upwards when the pushchair is in the current utilization position (FIGS. 6a and 7a). A rear end of each large arch 36 is provided with a finger 44 which engages into the rail of the matching small arch 37 to move along such rail, between the ends thereof, when the pushchair switches from the single configuration to the tandem configuration.
The front end of the large arch 36 is attached to the front end of the matching horizontal side bar 43 by a pivot connection which enables same to change its inclination when the pushchair switches from the single configuration to the tandem configuration The auxiliary seat 12 is mounted with the ability to move in translation in its retracted configuration underneath the seating surface of the main seat.

For instance, the means for translating the auxiliary seat may comprise side rails provided on the inner faces of the side bars 43, and additional fingers provided on the seating surface of the auxiliary seat, or any other suitable means.

Figure 9C:
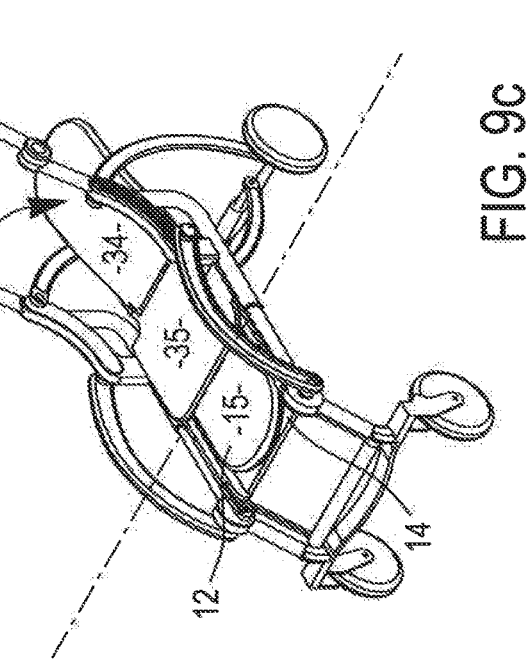
FIGS. 9a to 9d illustrate the second embodiment of the invention in a configuration where a child is lying down, in views at the 1:5 scale respectively a side view (a), a front view (b), a front side view in perspective (c), and a top view (d)
Figure 9B:
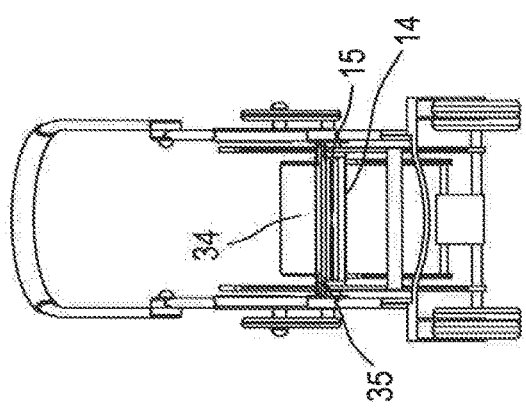
Figure 9A:
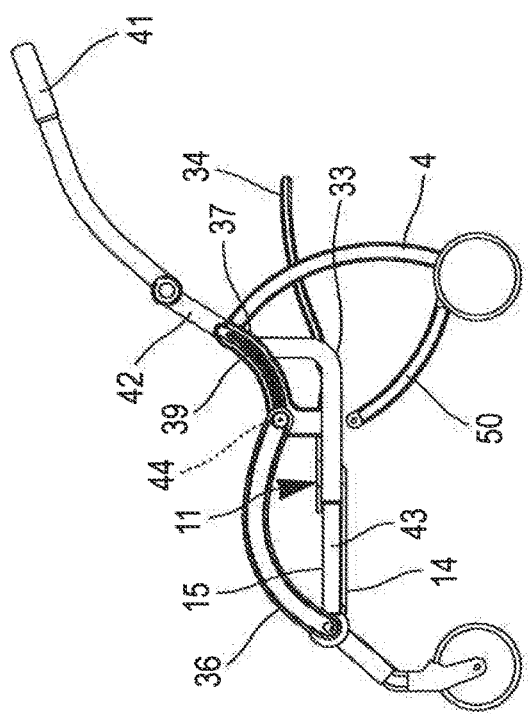
Figure 9D:
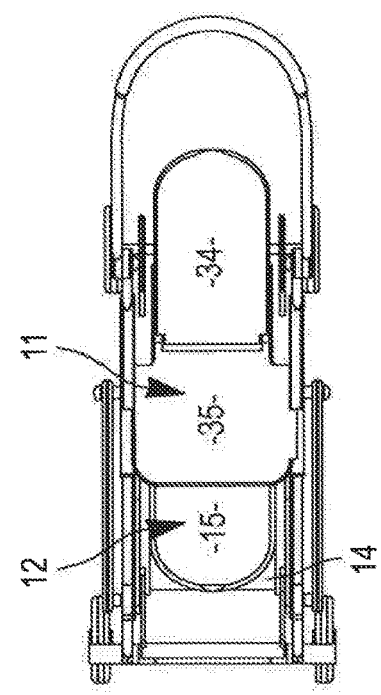

It is advantageously mounted to move between:
- a position in which it is completely retracted under the main seating surface 35 (FIG. 6c), in which the finger 44 supported by the large arch 36 is placed at the top rear end of the small arch 37 and the bar 43 totally stored within the elbow
- the position as far forward as possible with respect to such main seating surface 35 (FIG. 7c), in which the finger 44 supported by the large arch 36 is positioned at the bottom front end of the small arch and the bar 43 is deployed outside the elbow, In this position, the back 15 of the auxiliary seat 12 can be returned to its upright position and a sufficient space (over 10 cm) exists, along the bar 43, to part the seating surface of the main seat from the back of the auxiliary seat 12, to leave room for the legs of a child seating at the back,
- an intermediate position shown in FIG. 9c, in which the seating surface 15 of the auxiliary seat is partially covered by the seating surface of the main seat and extends same to form a support for a child lying down. As can be seen in FIG. 9a, the upper surface of the seating surface of the main seat 11 and the upper surface of the back 15 of the auxiliary seat folded flat frontwards can be slightly offset in height.

In the intermediate position in which a child is lying down, as shown in FIG. 9c, and as illustrated in FIG. 13, the pushchair defines a support, for instance 92 cm long, whereon a preferably foldable mattress can be attached, preferably having side 61 and at least front 62 rims and/or preferably having two heights, which take account of the offset in height mentioned above between the upper surface of the seating surface of the main seat 11 and the upper surface of the back 15 of the auxiliary seat retracted frontwards underneath (it will be thicker on the front than at the back), so that the upper surface of the mattress is planar.

The side 61 and front 62 rims may be separated by releasing the ties 64 which connect same to the adjacent edges thereof, but hinged relative to the matching side of the basis 63 of the mattress, so as to be folded against same, and the assembly may be folded again to reduce the overall dimensions thereof and be put in a bag of the pushchair.

In this regard, FIGS. 10 and 11 show a storage case 67 positioned under the seating surfaces of the seats, made of a material or with a structure making it possible to extend longitudinally with the pushchair when the latter switches between the tandem and single configurations.

As shown in FIG. 10, the pushchair may include other accessories such as:
- supports for mobile terminals 66, such as a tablet or a smartphone, to be clipped on the large arch, for instance,
- supports for a scooter 70 or any other object having a tubular part,
- a protective cover, having a protective coating against rain or UV rays, which can be folded in a pocket inside the cover, for instance closed by a zip 69
- a basket 71, as shown in FIG. 11, which can rely on the auxiliary seat, in its deployed position, and be provided with means for attaching same thereto
- a bunting bag 72, as shown in FIG. 12, to be attached behind the back of the main seat having a position inclined frontwards, with the bunting bag and the rear of the back being, of course, provided with additional attaching means.
- As shown in FIG. 1, the auxiliary seat 12 may include a footrest 46 having the shape of a U both ends of which are attached to the ends of the front edge 47 of the seating surface 14 thereof, and the footrest 46 will then be accessible to a single child seating in the main seat (FIG. 6a, as for a child seating in the auxiliary seat (FIG. 7).

To fold/unfold the pushchair, the rear uprights can be mounted with the ability to pivot about a horizontal shaft which coincides with the angle of the elbow (an alternative embodiment shown in FIG. 8) or with the upper end of the small arch 37 (an alternative embodiment shown in FIG. 7), with the pushchair then also comprising auxiliary reinforcing rear uprights 50.

According to this embodiment, the pushchair is folded from its single configuration, as shown in FIG. 8, by:
- pivoting the rear uprights 4 under the superimposed seating surfaces of the seats
- folding downwards the gripping frame which is positioned along the rear uprights 4.

The invention is described above as an example. It is understood that those skilled in the art are capable of creating different alternative embodiments of the invention without departing from the scope of the invention.

The invention claimed is:

1. A single pushchair that can be converted into a tandem pushchair, comprising:
   a rolling chassis;
   a main seat mounted with the ability to move in longitudinal translation with respect to the chassis between a single-occupant position and a dual-occupant position;
   an auxiliary seat, mounted with the ability to move in longitudinal translation with respect to the chassis between an inactive position retracted underneath the main seat in its single-occupant position, and a deployed active position outside the main seat in its dual-occupant position.

2. The pushchair according to claim 1, wherein the auxiliary seat comprises a seating surface and a back which can be folded against the seating surface in the retracted inactive position.

3. The pushchair according to claim 2, comprising means for automatically moving the back of the auxiliary seat from a folded position to the deployed position when the auxiliary seat is moved between its retracted position and its deployed position.

4. The pushchair according to claim 1, wherein the main seat is mounted with the ability to move in longitudinal translation via a shaft sliding in a chassis rail.

5. The pushchair according to claim 1, wherein the main seat is mounted with the ability to pivot between a position in which the occupant is seating and a position in which the occupant is lying down in the single-occupant position and/or in the dual-occupant position.

6. The pushchair according to claim 1, wherein the chassis comprises two front uprights supporting the front wheels and two rear uprights supporting the rear wheels, with the front and rear uprights positioned on the same side of the chassis being secured together by means of a main cross-bar.

7. The pushchair according to claim 6, wherein the main seat is mounted with the ability to pivot between the position in which an occupant is seating and a folded position of the pushchair in which it is folded between the front uprights of the chassis when the auxiliary seat is in its retracted position.

8. The pushchair according to claim 7, wherein the rear uprights are mounted with the ability to pivot relative to the cross-bar between a conventional rolling position and a folded position of the pushchair in which they are positioned substantially parallel to the front uprights.

9. The pushchair according to claim 8, wherein the auxiliary seat and means for moving the auxiliary seat between the retracted and deployed positions are contained in the volume defined by the front uprights and the rear uprights when in the same position taken when the pushchair is folded.

10. The pushchair according to claim 1, wherein means for moving the auxiliary seat between the retracted and deployed positions thereof comprise a rigid part having a C-shaped section, the opening of which is oriented towards the front of the pushchair, and the two parallel branches of which are mounted with the ability to slide relative to the pushchair chassis.

11. The pushchair according to claim 1, wherein the chassis comprises:
   a first portion and a second portion, in translation with respect to each other, said first portion comprising two side supports stationary relative to said main seat and two guide rails integral with the matching supports, said second portion comprising:
   two side bars which can be translated relative to said side supports of said first portion, said side bars being connected to said auxiliary seat, and
   two side arms mounted, by the matching ends thereof, to the front ends of the corresponding side bar by means of pivot connections, with the opposite ends of such side arms translating in said guide rails of said first portion when the pushchair is changed from a single configuration to a dual configuration.

12. The pushchair according to claim 11, wherein the auxiliary seat is mounted with the ability to translate with respect to the bar between its retracted and deployed positions.

13. The pushchair according to claim 12, comprising means for locking the auxiliary seat in an intermediate position, wherein, when the back is folded against the seating surface thereof, the rear face of the seating surface extends as a longitudinal extension of the seating surface of the main seat.

14. A mattress specially adapted to the pushchair according to claim 13, comprising a base defining two different thicknesses liable to make up for a difference in height which may exist between the upper surface of the folded back of the auxiliary seat in the intermediate position thereof and the upper surface of the seating surface of the main seat.

15. A bag specially adapted to the pushchair according to claim 1, having variable dimensions in the direction of the extension of the pushchair between the tandem and single configurations thereof.

* * * * *